Jan. 9, 1951

J. M. McCORMICK 2,537,778

PERFORATED RECORD CARD

Filed Feb. 18, 1948

INVENTOR.
JOHN M. McCORMICK

BY

ATTORNEY

Patented Jan. 9, 1951 2,537,778

UNITED STATES PATENT OFFICE 2,537,778

PERFORATED RECORD CARD

John M. McCormick, Brookview, N. Y., assignor to Remington Rand Inc., New York, N. Y., a corporation of Delaware Application February 18, 1948, Serial No. 9,311

6 Claims. (Cl. 235—61.12)

This invention relates to the entering of data in the perforated record cards employed in the control of statistical, accounting and like machines; and it includes an improved card, and an improved method of simply and accurately perforating said cards.

In the well known card controlled accounting systems, such as the Powers and the Hollerith systems, data is recorded by the perforating or marking of certain index positions on the record cards. In particular situations it is desirable to perforate or mark said cards in the field, or at the source of data. Various means, heretofore, have been utilized to accomplish this.

One of said means for recording data at the source has been the well known Powers hand punch, as disclosed in Patent 2,307,617 to Karl J. Braun, which is both portable and inexpensive. However, in employing the hand punch for recording data at a source, the use of perforated record cards is limited to those departments or persons provided with one of said punches. It is conceivable, therefore, that situations may arise when data cannot be so recorded.

Another of said recording means has been the well known "marked sensing" means as disclosed in Patent 1,573.174 to W. W. Lasker, Jr., wherein the certain index positions of record cards are marked with data representations of an electrically conductive nature. Marking of a record by this means, however, has proved cumbersome and dependent upon the provision of a suitable electrically conductive marking material, and often results in error during subsequent sensing when said marking material fails to isolate itself in selected ones of said index positions. Also, in order to be useful for tabulating operations, it often has been necessary to convert the "marked" data on the original record cards to corresponding perforated data in permanent record cards. Faulty marking of said original record cards consequently has resulted in the erroneous perforating of said permanent record cards.

In view of the foregoing it is one object of the present invention to provide an improved record card for subsequent tabulating operations, in which data may be entered simply and accurately without the agency of perforating machines, hand punches, or marking materials.

It is another object of the present invention to provide an improved record card for tabulating purposes, in which areas comprising the index positions are removable, in order that perforated data may be entered in said record simply and accurately with the aid of an acuminate instrument, such as a pencil.

It is another object of the present invention to provide an original and permanent record card for tabulating purposes, wherein perforated data may be entered at a source of said data, thereby eliminating the possibility of error encountered when "marked" data is converted to perforated data by machine or a machine operator.

These and other features, capabilities and advantages of the invention will appear from the subjoined detail description of specific embodiments thereof illustrated in the accompanying drawing, in which Fig. 1 illustrates the well known Powers card, having a field of index positions in accordance with the invention;

Figure 1:
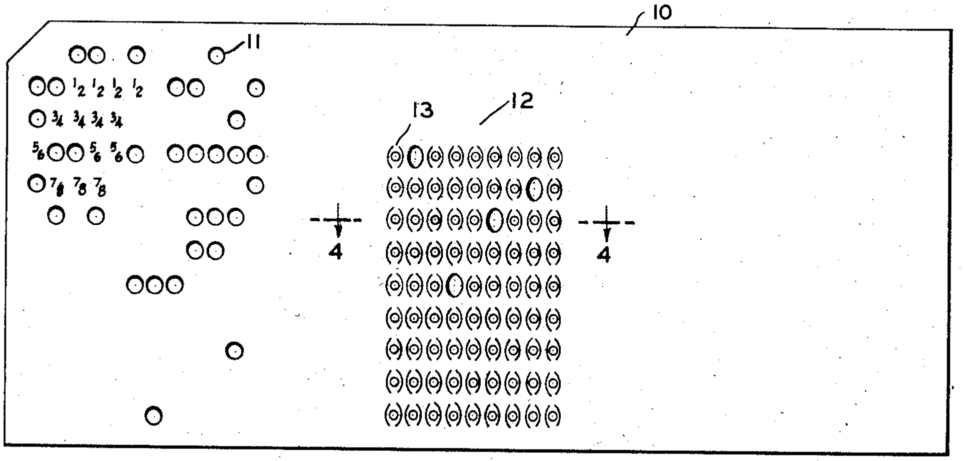

In more detail and as shown in Fig. 1, the well known Powers record card 10 has recorded therein data as represented by perforations 11, said perforations being of the type rendered by a key punch. A field 12 of index positions 13 in said record card is reserved for the entering of data at a source where the agency of a key punch or hand tool is unavailable or inconvenient. As is more readily seen in Fig. 2, each index position 13 is provided with a predefined and removable portion 14, formed by the scarfings 15. Retaining webs 16, however, maintain said removable portion 14 integral with the record card 10. Disposed in the center of each removable portion 14 is a pre-punched hole 17.

Figure 2:
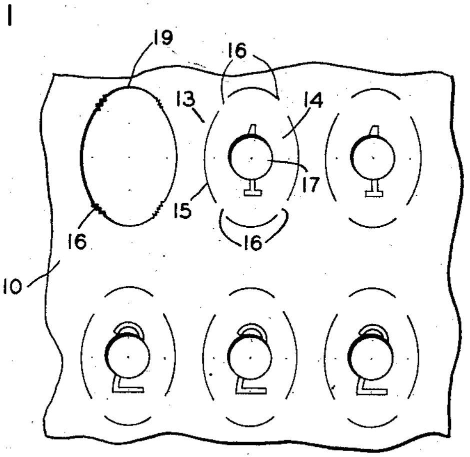
Fig. 2 is an enlarged fragmentary view of the index positions in accordance with the field illustrated in Fig. 1.
Figure 3:
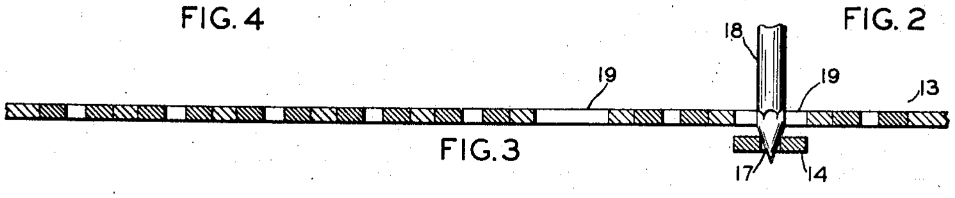
Fig. 3 is an enlarged sectional view taken along the line 4—4 in Fig. 1, and showing an index position being removed.

As will be better seen in Fig. 3, the insertion of the point 18 of a pencil or stylus in the hole 17 and a subsequent application of pressure to said pencil will rupture simultaneously the aforementioned retaining webs 16. It is to be noted that the simultaneous rupturing of said retaining webs and the resulting substantially perfect index perforation 19 (see Figs. 2 and 3) are directly attributable to the centrally disposed pre-punched hole 17 and the manner in which it equally distributes an applied pressure. If said webs 16 were not ruptured simultaneously, as would be the case if no hole 17 were provided, peeling about the perforation 19 and other card deformities would be effected, which, although slight, would be sufficient for affecting the effective thickness of the said card 10. As generally known in the punched-card art, a change in card thickness often results in card feeding difficulties.

Figure 4:
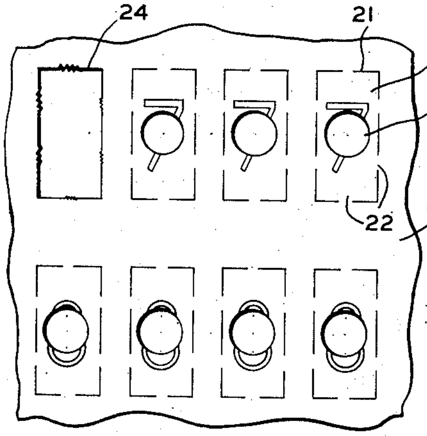
Fig. 4 is an enlarged fragmentary view of a card field having an alternative form of index positions.

It will be clear that the scarfings may be in curved or straight lines in order to provide removable portions of any shape. An alternative form, as shown in Fig. 4, provides a rectangular removable portion 20, formed by scarfings 21, and maintained integral with the record card 10 by retaining webs 22. A pre-punched hole 23 is adapted to receive the point of a pencil, as did hole 17 in Fig. 3. In a manner similar to that hereinabove described, the application of pressure to said pencil removes said portion 20 to form a clear and accurately disposed rectangular perforation 24.

Figure 5:
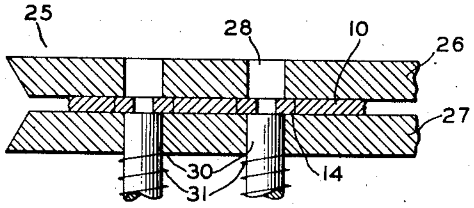
Fig. 5 is a fragmentary sectional view of a card sensing chamber, having therein a record card in accordance with the form shown in Fig. 2.

Most mechanical sensing mechanisms similar to that shown in Patent 2,044,119 to W. W. Lasker are such that sensing pins are permitted to pass through a record card at index positions which have been previously perforated. Those pins related to non-perforated index positions are depressed under spring tension by said record card. A means is provided to prevent these depressed or inactive pins from causing the rupture of the above mentioned retaining webs 16, thereby also preventing the entry of inaccurate perforations in said record card 10. As is seen in Fig. 2, the removable portion 14 is of an oval or elliptical shape. Now with reference to Fig. 5 it is seen that when the record card 10 is in the sensing chamber 25 and is between the upper and lower plates 26 and 27, respectively, the major axis of the elliptical portion 14 is greater than the diameter of the upper plate hole 28.

Figure 6:
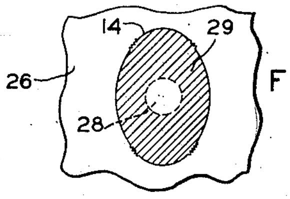
Fig. 6 shows that part of the index positions which acts as a support.

In Fig. 6, the shaded portion 29 represents the difference in area between the upper plate hole 28 and the removable portion 14. Said shaded portion 29, in engaging the upper plate 26 during the sensing operation, affords a support to the retaining webs 16. In this manner the depressed pins 30, under tension of springs 31, are prevented from rupturing said retaining webs and thereby entering inaccurate data in said record card. It will be seen that if no such support were provided, said retaining webs 16 would necessarily have to be wider for withstanding the pressure of said yieldable pins 30. It will also be seen that wider webs would be less likely to fracture simultaneously, and would be more likely to cause the aforementioned peeling about the perforation 19 and other card deformities.

While I have described what I consider to be highly desirable embodiments of my invention, it is obvious that many changes in form could be made without departing from my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. A card adapted to be perforated with index perforations and for use in card controlled machines, having a plurality of index positions, each of said positions comprising a portion retained integral with said card by rupturable connections, and a centrally disposed pre-punched hole for facilitating the rupture of said connections and, therefore, the removal of said portion.

2. A card adapted to be perforated with index perforations and for use in card controlled machines, having a plurality of index positions, scarfings about each of said positions for rendering portions thereof manually removable to provide index perforations, and centrally disposed pre-punched holes in the removable portions for facilitating the removal thereof and effecting substantially perfect index perforations.

3. In a card adapted to be manually perforated with index perforations and for use in card controlled machines, an index field, a plurality of index positions in said field, each index position having a portion thereof predefined by a plurality of scarfings and retained integral with said card by webs formed between said plurality of scarfings, and a pre-punched centrally disposed hole in the predefined portion for effecting the equal distribution of an applied pressure to the said webs.

4. A card for controlling the operation of tabulating machines and in which perforated data may be entered manually, having in an index field thereof, a plurality of index positions, each of said positions comprising a portion predefined by a plurality of scarfings and retained integral with said card by webs formed between said scarfings, said webs being rupturable for removing said portion to thereby form an index perforation, and a pre-punched centrally disposed hole in the predefined portion and effective for distributing an applied pressure equally to said webs to thereby effect the simultaneous rupture thereof.

5. A perforated record card adapted to be operated on by a sensing means including a plurality of reciprocable and yieldable sensing elements, upper and lower plates for holding said card therebetween during a sensing operation and having aligned holes therein corresponding to and for the guidance of said sensing elements, said record card having in an index field thereof a plurality of index positions corresponding to said plurality of holes and said sensing elements, said index positions each having a portion thereof predefined and rendered removable by a plurality of scarfings, webs formed by said scarfings and effective for retaining the removable portion integral with said card, said webs being rupturable for removing said portion to thereby form an index perforation, and said removable portion being greater in area than the corresponding holes in said plates and thus self supported for resisting the rupture of said webs by the corresponding sensing element during a sensing operation.

6. The method of manually entering perforated data in a record card having a plurality of index positions, consisting in predefining a portion of each said index positions with a plurality of scarfings, maintaining webs between said scarfings for retaining the predefined portions integral with said card, pre-punching centrally disposed holes in said predefined portions, and inserting a pointed instrument in selected ones of said pre-punched holes and applying pressure thereto for rupturing simultaneously the webs between the scarfings about the said selected holes to thereby effect substantially perfect data perforations.

JOHN M. McCORMICK.

REFERENCES CITED

The following references are of record in the file of this patent:

UNITED STATES PATENTS

| Number | Name | Date |
|---|---|---|
| 2,000,851 | Knell | May 7, 1935 |
| 2,044,119 | Lasker | June 16, 1936 |
| 2,244,231 | Armbruster | June 3, 1941 |
| 2,307,617 | Braun | Jan. 5, 1943 |
| 2,315,737 | Ross | Apr. 6, 1943 |